(12) United States Patent
Jens et al.

(10) Patent No.: US 6,387,305 B1
(45) Date of Patent: May 14, 2002

(54) FORMING MOLD CAVITIES

(75) Inventors: Stephen C. Jens, Winchester; Andrew C. Harvey, Waltham; Gilbert G. Fryklund, Winchester; James W. Babineau, Newton, all of MA (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 09/671,958

(22) Filed: Sep. 27, 2000

Related U.S. Application Data

(63) Continuation of application No. 08/920,188, filed on Aug. 25, 1997, now abandoned.

(51) Int. Cl.⁷ .............................................. B29C 33/38
(52) U.S. Cl. .................... 264/81; 264/219; 204/192.15; 205/149; 205/151; 205/182; 205/186; 205/187; 427/250; 427/405
(58) Field of Search .............. 264/81, 219; 204/192.15; 205/149, 151, 182, 186, 187; 427/250, 405

(56) References Cited

U.S. PATENT DOCUMENTS

| | | |
|---|---|---|
| 3,752,619 A | 8/1973 | Menzin et al. |
| 3,762,000 A | 10/1973 | Menzin et al. |
| 3,843,763 A | 10/1974 | Coll-Palagos |
| 4,116,594 A | 9/1978 | Leanna et al. |
| 4,636,161 A | 1/1987 | Raley et al. |
| 4,794,028 A | 12/1988 | Fischer |
| 5,240,666 A | 8/1993 | Schnyder er al. |
| 5,260,015 A | 11/1993 | Kennedy et al. ............ 264/167 |
| 5,759,455 A | 6/1998 | Kamitakahara et al. |
| 5,900,350 A | 5/1999 | Provost er al. |
| 5,922,222 A | 7/1999 | Jens et al. |
| 5,971,738 A | 10/1999 | Jens et al. |
| 6,010,609 A | 1/2000 | Mimura et al. |
| 6,099,289 A | 8/2000 | Jens et al. |
| 6,120,280 A | 9/2000 | Mimura et al. |
| 6,129,540 A | 10/2000 | Hoopman et al. |
| 6,131,251 A | 10/2000 | Provost |

FOREIGN PATENT DOCUMENTS

| | | |
|---|---|---|
| EP | 0 719 507 | 3/1996 |
| EP | 0 745 337 | 4/1996 |
| JP | WO97/04940 | 2/1997 |
| JP | WO97/04939 | 3/1997 |

*Primary Examiner*—Suzanne E. McDowell
(74) *Attorney, Agent, or Firm*—Fish & Richardson P.C.

(57) ABSTRACT

A method for producing a multiplicity of miniature cavities extending from a mold surface for molding a plastic product having features integrally molded with and extending from a product base, and a mold so produced. The mold cavities are formed by depositing multiple layers of plating material on a workpiece in a predetermined pattern selected to produce a desired mold cavity shape. The mold may be in the form of a roll or belt for continuous processing, or in any form for discrete injection molding. The invention is particularly applicable to the production of touch fastener products, such as those with arrays of miniature hooks.

45 Claims, 9 Drawing Sheets

FORMING MOLD CAVITIES

This application is a continuation of Application No. 08/920,188, filed Aug. 25, 1997, now abandoned.

BACKGROUND OF THE INVENTION

This invention relates to the forming of miniature mold cavities for molding small features integral with a base sheet, and has particular application to the production of touch fasteners and the like.

Touch fastener products have arrays of miniature fastener elements (for instance, hook-shaped or mushroom-shaped elements) extending from a common base. Typically, in order to be capable of engaging a loop fiber or another fastener element, these fastener elements have overhanging "crooks", such as the hook portion of a hook-shaped element or the underside of the head of a mushroom-shaped element. These crooks snag and retain loop fibers, for instance, to form a fastening, but can be challenging to mold in their fully functional form in non-opening mold cavities.

One solution for continuously molding such fastener elements for touch fasteners and other products was disclosed by Filcher in U.S. Pat. No. 4,794,028. In commercial implementations of his solution, a cylindrical, rotating mold roll is composed of a large number (e.g., thousands) of thin, disk-shaped mold plates and spacer plates which are stacked concentrically about a central barrel. Extending inwardly from the periphery of the mold plates are cavities for molding the hook elements. These mold cavities are composed of contoured mold surfaces in the mold plates in combination with flat side surfaces of adjoining spacer plates. To produce mold plates for current production machines, each contoured mold surface is typically formed by electro-discharge machining (EDM) methods.

SUMMARY OF THE INVENTION

We have realized that extremely small mold cavity surfaces can be accurately formed at reasonable cost by controllably building up mold material in patterned layers, such as by plating techniques.

The invention features a method of producing a multiplicity of cavities extending from a common surface, for molding a plastic product having a multiplicity of features integrally molded with and extending from a product base. The method includes depositing multiple layers of plating material on a workpiece in a predetermined pattern selected to produce a desired mold cavity shape, and forming, with the plating material, mold surfaces for defining a multiplicity of feature-shaped mold cavities extending from a common surface.

In some cases, the cavities each have a crook for molding a fastener element, such as a hook-shaped fastener element, with an engageable crook portion.

Preferably, the cavities are constructed to mold features of less than about 0.050 inch in total height, more preferably less than about 0.025 inch in total height, as measured from the product base.

The workpiece can, for instance, comprise at least part of a mold for molding a plastic fastener product.

The method can include the steps of applying a masking material to selected portions of the workpiece to produce masked surfaces, depositing a layer of the plating material to the workpiece to surfaces other than the masked surfaces, and removing the masking material from the masked surfaces to expose unplated surfaces of the workpiece.

In some cases the workpiece comprises a flat plate, the plating material being deposited on one broad side of the plate to form mold surfaces at an edge thereof, for defining mold cavities extending from the edge. The plating material can be deposited to form one side of a mold cavity, another side of the cavity being defined by a surface of an adjoining plate. The deposited plating material can be machined to remove an outer portion thereof to provide a flat surface for abutting an adjoining mold part.

The plating material, in some embodiments, defines fully-formed mold cavities, each extending from an innermost portion to a base portion at an outer surface of the plating, the layers of deposited plating material defining, in order of deposition, the cavities from their innermost portions to their base portions. The workpiece can comprise a flexible belt.

The overall thickness of the multiple layers of plating material is preferably between about 0.001 inch and 0.015 inch, more preferably between about 0.002 inch and 0.007 inch, even more preferably about 0.004 inch.

In some embodiments the workpiece comprises a master, the method further comprising the step of removing the master from the plating to form a mold for molding a plastic fastener product. The master can have fastener elements, such as hook-shaped fastener elements, extending from a surface of the product base. Sometimes the method includes depositing a layer of metal, such as copper, on the master before depositing the plating material.

The mold can include a cylindrical mold sleeve with fully-formed mold cavities extending inward from its outer surface.

Preferably the mold has an overall thickness of between about 0.005 inch and 0.050 inch.

The invention also features a method of producing a multiplicity of cavities extending from a common surface of a mold, for molding a fastener product having an array of fastener elements integrally molded with and extending from a product base. The method comprises depositing multiple layers of plating material on a workpiece in a predetermined pattern selected to produce desired mold cavity shapes, including building up the plating material to a sufficient thickness to encompass and form mold surfaces within the thickness of the plating.

According to another aspect of the invention, a mold is provided for molding a plastic product having features integrally molded with and extending from a product base. The mold includes a stratum of mold material having an outer surface and composed of multiple layers of plating material deposited in a predetermined pattern. The stratum of mold material defines therewith in a multiplicity of mold surfaces comprising the plating material in an as-deposited state. The mold surfaces are arranged to form mold cavities extending inwardly from the outer surface of the stratum of mold material for molding an array of features integral with a base formed by the outer surface of the stratum. The mold is preferably constructed to mold a fastener element with an engageable crook portion.

The stratum of mold material is preferably between about 0.001 inch and 0.015 inch.

The mold can be constructed to rotate to continuously produce a product in strip form, and can be in the form of a mold roll or a mold belt, for instance.

In some embodiments, the mold includes a flat plate, the plating material being disposed on one broad side of the plate to form mold surfaces at an edge thereof for defining mold cavities extending from the edge. The mold can include a multiplicity of such flat plates stacked together along a common axis.

In some cases the mold roll is composed of a cylindrical mold sleeve with fully-formed mold cavities extending inwardly from its outer surface. The mold sleeve preferably has an overall thickness of between about 0.005 inch and 0.050 inch, and can have an outermost layer containing copper.

By "plating material" we mean metal-containing material that is deposited as a thin, free-form layer upon a surface, such as by electroplating, electroless plating, sputtering or vapor deposition, for examples.

Molds produced according to the invention can be very cost-effective, as multitudes of very accurate and extremely small mold surfaces can be simultaneously formed without precise machining of each individual mold surface. Molds with fully-formed mold cavities enclosed and defined by multiple layers of plating material can be readily produced in thin, semi-disposable sleeve or belt form, easily replaced and providing high rates of heat transfer from the mold cavities, thus enabling high production speeds.

These and other advantages and features will be understood from the following description, drawings and claims.

DESCRIPTION OF PREFERRED EMBODIMENTS

Figure 1:
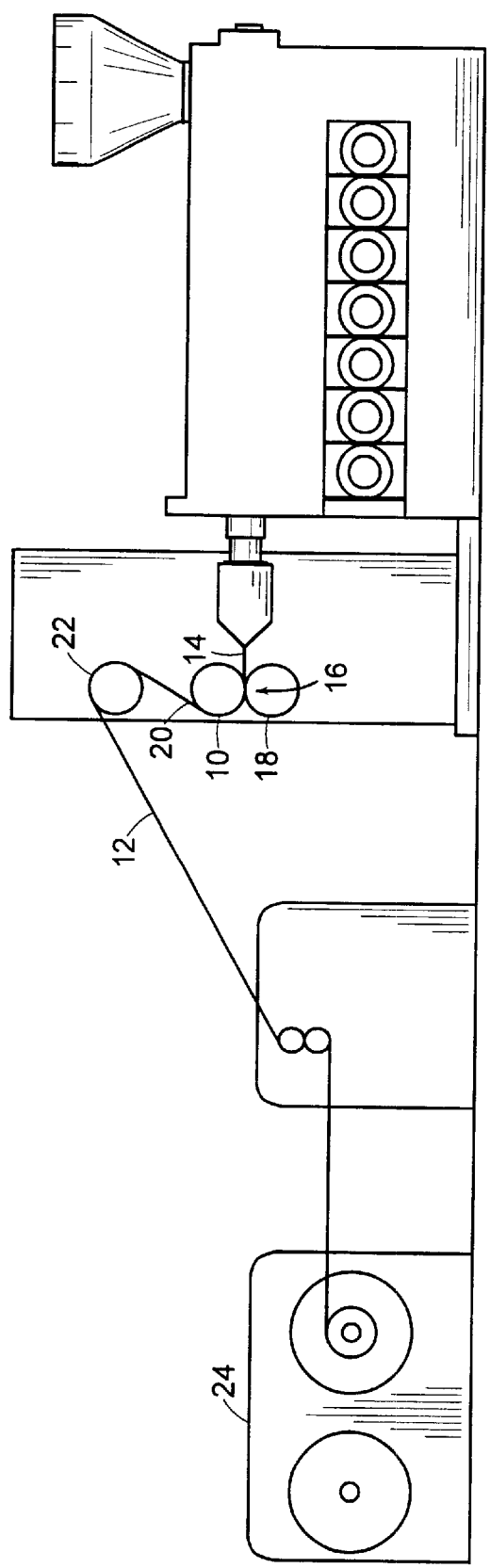
FIG. 1 is a schematic representation of a molding system employing a mold roll.

FIG. 1 illustrates a molding system using a mold roll 10 for the production of fastener elements for touch fastener products. The process and basic machine shown are in accordance with the Filcher techniques as described in U.S. Pat. No. 4,775,310, 4,794,028 and 4,872,243, which are hereby incorporated by reference as if they were fully set forth.

The mold roll 10 has miniature fastener shaped mold cavities about its periphery for forming fastener projections on an extruded strip-form touch fastener product 12. Mold roll 10 comprises many annular, thin mold plates of, for instance, 10 to 12 inch diameter, held together as a stack. Heat-softened synthetic resin 14 is forced into the cavities under pressure at nip 16, between mold roll 10 and pressure roll 18. In a continuous process, the fastener projections at least partially solidify in the mold cavities, and are then pulled out of the cavities in area 20 after the product has cooled to a temperature at which the projections have solidified sufficiently to be pulled intact out of their mold cavities, remaining integral with the base sheet of the product. The projections are pulled out of mold roll 10 by passing the product around an idler roll 22, and from there to a takeup assembly 24.

Figure 2:
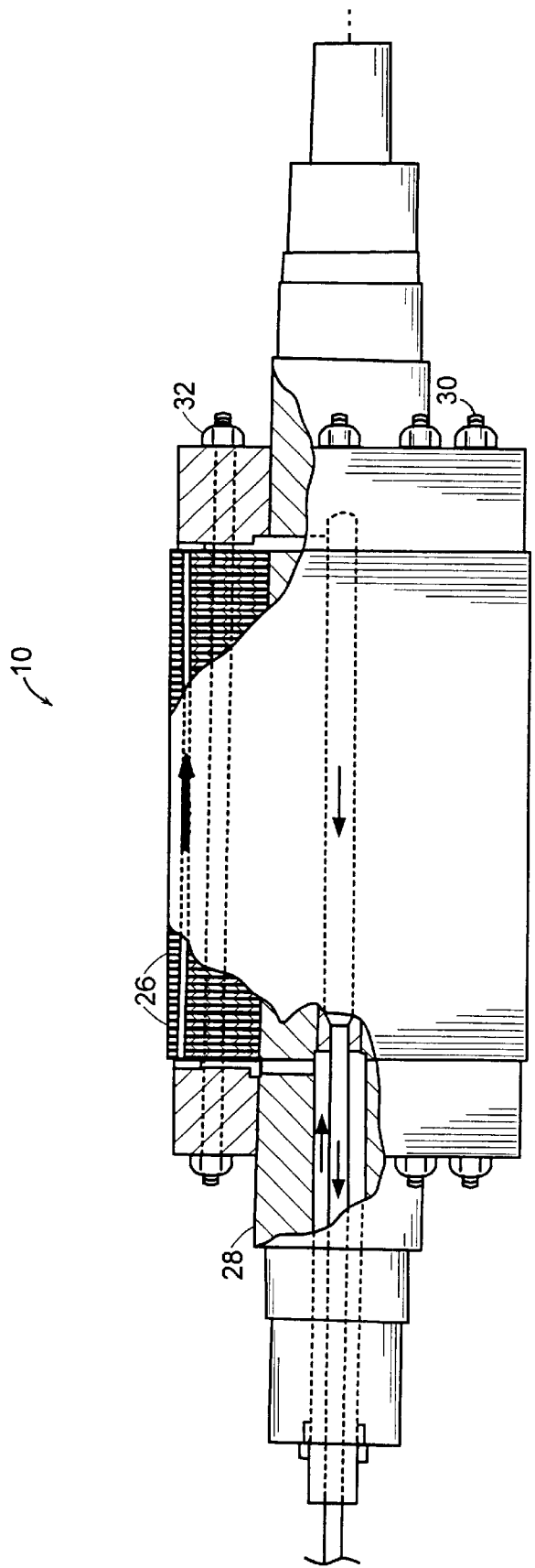
FIG. 2 is a fragmentary cross-sectional view of a mold roll, illustrating a first construction.

Referring to FIG. 2, a multiplicity of individual mold plates 26 of mold roll 10 are aligned and stacked axially around a common shaft 28. Plates 26 are held together under axial compression by an array of tie rods 30 extending through aligned holes in the stack of plates, running parallel to shaft 28 and tensioned by threaded nuts 32 at each end.

Figure 3:
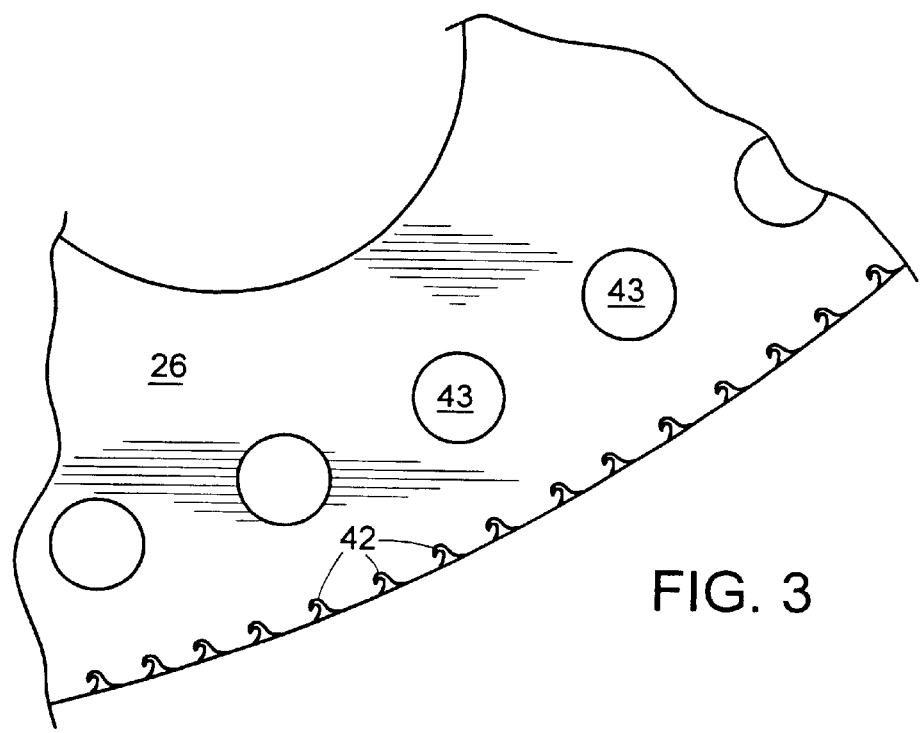
FIG. 3 is an enlarged, fragmentary view of a mold plate with mold surfaces at the peripheral edge of the plate.

As seen in FIG. 3, mold plates 26 have mold surfaces 42 formed at their peripheral edges, on at least one side of each plate. Mold surfaces 42, in combination with a planar side surface of an adjacent plate, define fastener-shaped mold cavities at the peripheral surface of the assembled mold roll. Coolant holes 43 extend through plates 26 near mold surfaces 42 for circulating coolant to control the temperature of the mold surfaces. Also shown is a portion of a tie rod hole for compressing the stack of plates.

Figure 4:
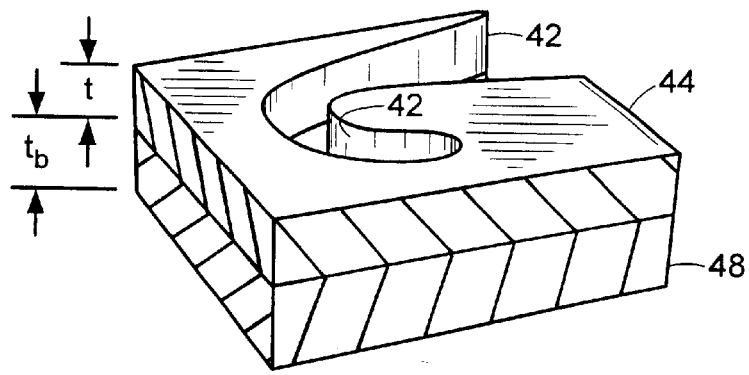
FIG. 4 is an enlarged, fragmentary, perspective view of a section of a mold plate about a mold surface.

Referring also to FIG. 4, the side of mold plate 26 with mold surfaces 42 comprises a plating 44 having a thickness, t, of about the depth of the mold surface. The mold surfaces are formed within the plating. Mold surfaces 42 are formed by building up plating 44, in successive layers, on a disk-shaped plate blank 48. Plate blank 48 is a metal plate of thickness $t_b$ (of, e.g., 0.006 inch), having outer and inner diameters, and tie rod and coolant holes, corresponding to the finished mold plate 26. One preferred material for plate blank 48 is 17-7 stainless steel.

Figure 6:
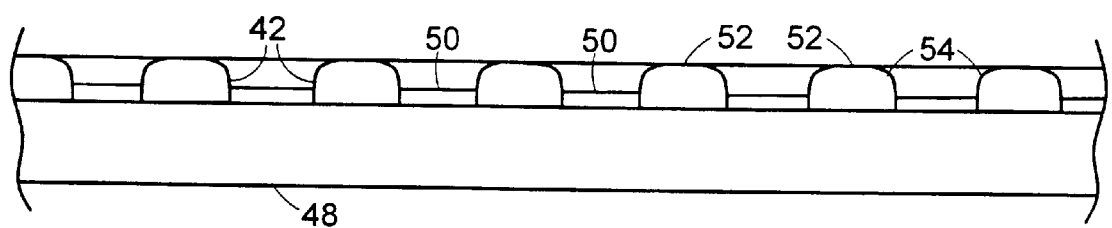
FIG. 6 is an enlarged edge view of a workpiece being plated to form mold surfaces.
Figure 5:
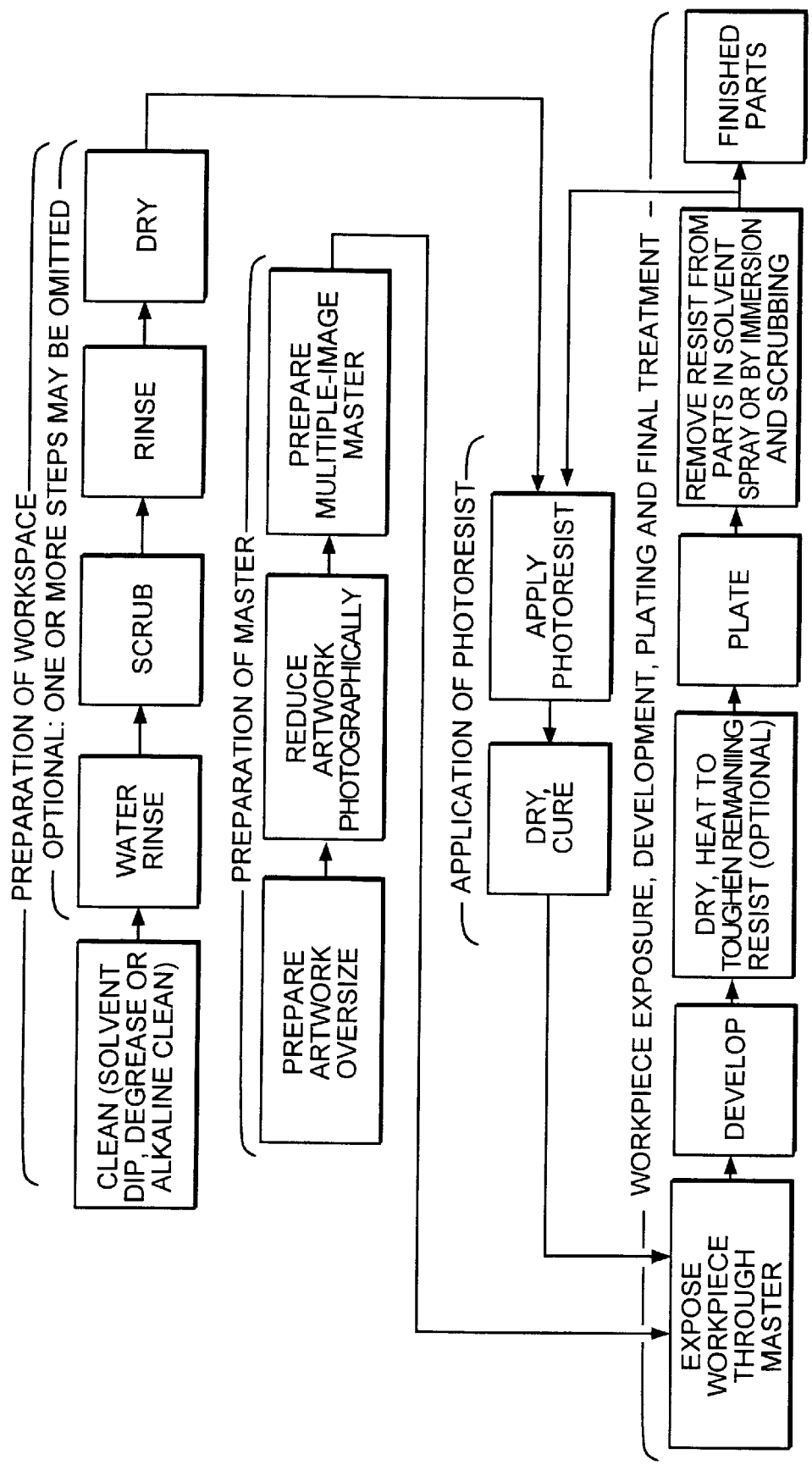
FIG. 5 is a flow chart illustrating a sequence of steps for forming mold surfaces in a mold plate.

A method of building up plating 44 on a plate blank is illustrated in the flow chart of FIG. 5, with reference to the fragmentary, enlarged plate cross-section of FIG. 6. First the workpiece (i.e., plate blank 48) is provided with a clean surface for receiving photoresist and plating. Photoresist material 50 is then applied to the surface of workpiece 48 and cured. A master mask, with cutouts in the positions of the finished hook cavities, is prepared and placed against the photoresist-covered surface of the plate blank on which mold surfaces 42 are to be formed. The photoresist material is subsequently developed and rinsed to leave photoresist deposits only in those areas of the plate blank to be left unplated (e.g., the area of the final hook cavities). The plate blank surface is then plated by known plating methods, which may include electroless (i.e., auto-catalytic) plating or electroplating, for example, to build up a layer of plating 52 on the exposed surface of workpiece 48. Details of how to prepare and apply photoresist materials to a workpiece surface can be found in Photochemical Machining, published in 1993 by ASM International in Materials Park, Ohio. Plating techniques are further discussed in the Modern Plastics Encyclopedia, 1984–85 version, published by McGraw Hill.

After plating 52 is formed, photoresist material 50 is removed, typically with an appropriate solvent. To build up a sufficient depth of plating 52, it may be necessary to repeat the step of plating several times. When forming mold surfaces of varying depth, it may be necessary to repeat the steps of applying and developing photoresist material 50 and plating, leaving a slightly different area of the surface of workpiece 48 exposed in each plating step (similar to progressive altitude outlines in a topographical map) to form a final mold surface approximating a smooth curve. The accuracy of the approximation will improve with thinner plating layers. For instance, a plating 52 of 0.004 inch thickness can be formed with eight successive plating steps, each step adding a layer of 0.0005 inch. Electroless plating is particularly suitable for multiple, very thin layerings, as it tends to deposit very even layer thicknesses, unaffected by field variations at corners or other surface discontinuities. When plating 52 has been sufficiently formed, all photoresist material 50 from the repeated masking steps is removed.

As illustrated in FIG. 6, plating tends to form slightly rounded corners 54 at the edges of the plated regions. In some applications, such rounded corners will not be undesirable, and may even form advantageously sharp features when adjoining a flat surface, for snagging loop fibers, for instance. In applications where necessary, additional plating depth may be built up such that the plated mold plate may be surface ground to provide square corners at the edges of plating 52.

Figure 7:
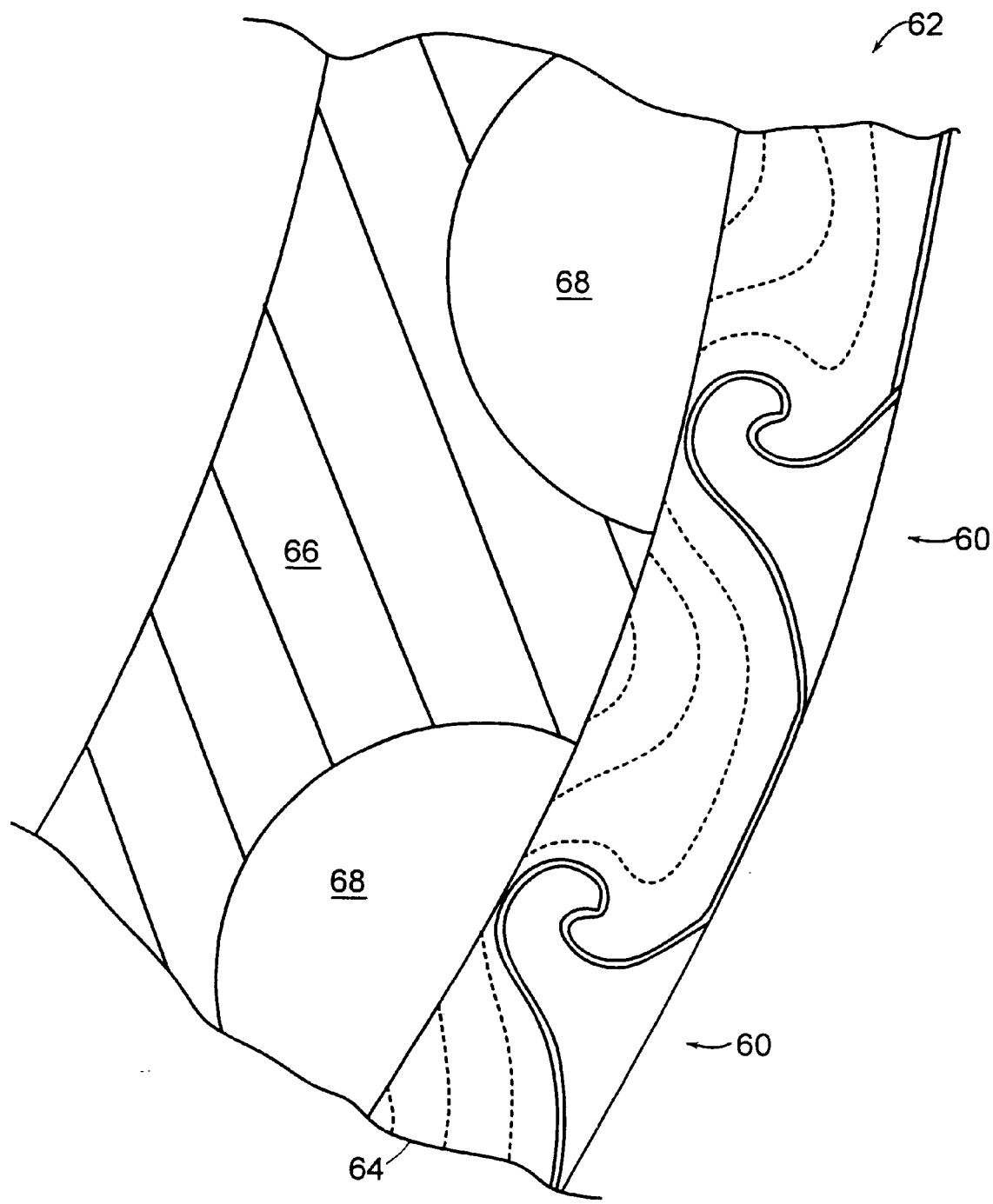
FIG. 7 is an enlarged, fragmentary view of a radial cross section of the outer portion of a second mold roll construction.

Referring now to FIG. 7, in another embodiment full mold cavities are formed by plating. Unlike the embodiment previously described, in which the mold cavities were defined, in part, by the flat surface of an adjoining mold plate, all surfaces that define mold cavity 60 (and even the outer base-forming surface of the mold roll) are formed by plating. Instead of comprising a multitude of thin, stacked plates, mold roll 62 has an outer mold sleeve 64 which defines fastener-shaped mold cavities 60. Mold sleeve 64 is held in tight contact with a cooling sleeve 66 having cooling passages 68 extending along its outer surface. Coolant is circulated along passages 68, in direct contact with the inner surface of mold sleeve 64. In this manner, cooling is provided very close to mold cavities 60, resulting in very good control of mold cavity temperatures and high heat transfer rates for running faster line speeds.

As illustrated by the dashed lines in FIG. 7, mold sleeve 64 is made up of several layers of plating. The mold sleeve can be formed to be very thin, having a radial thickness of, for instance, 0.020 inch or less. Mold roll 62, other than for the mold and cooling sleeves, is of typical construction, having a central barrel and appropriate hardware to hold the mold and cooling sleeves and to circulate the cooling fluid, such that mold roll 62 may function as mold roll 10 in the machine of FIG. 1.

Figure 8:
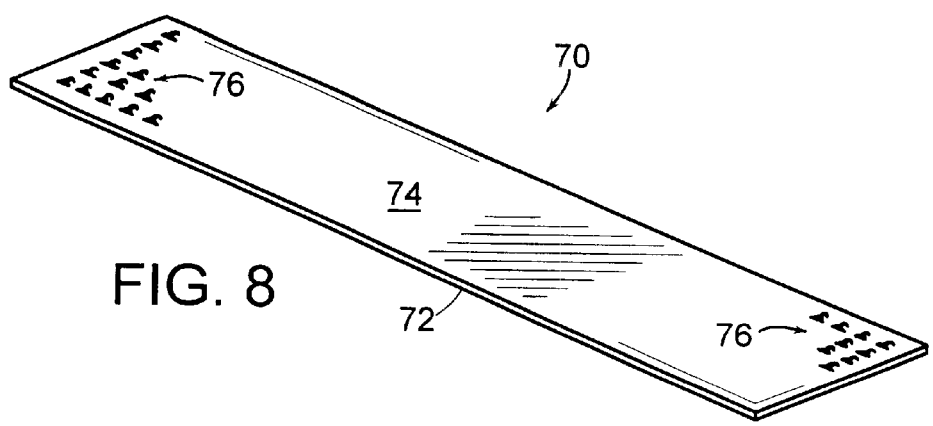
FIG. 8 is a perspective view of a plastic master with hooks extending from a base.
Figure 8A:
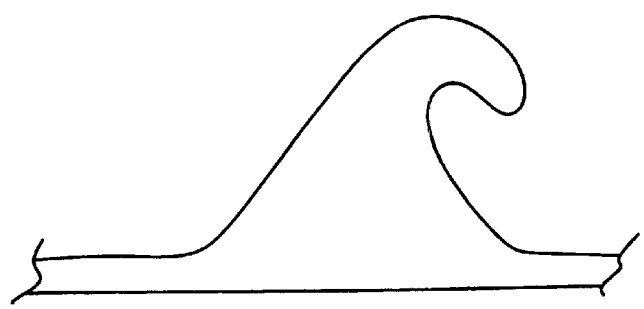
FIG. 8A is an enlarged view of one of the hooks of FIG. 8.
Figure 10:
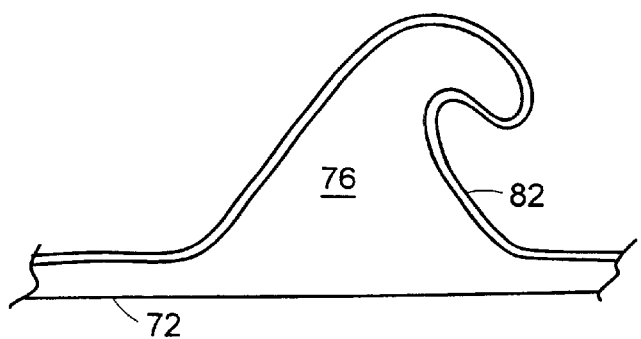
FIG. 10 shows the hook of FIG. 8A with a thin layer of metal applied.

One method of forming mold sleeve 62 is sequentially illustrated in FIGS. 8 through 12. Referring first to FIGS. 8 and 8A, a plastic master 70 is provided in strip form, having a base 72 with an upper surface 74 from which hooks 76, or other desired protrusions to be molded, extend. For illustration, only portions of surface 74 are shown with hooks.

Figure 9:
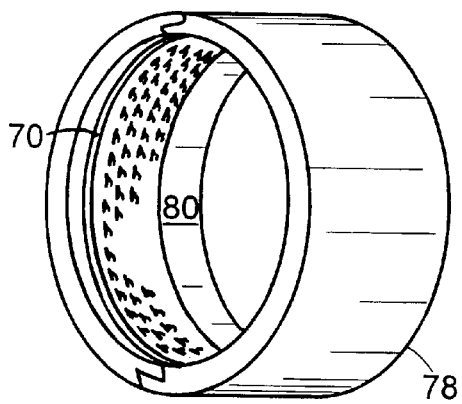
FIG. 9 illustrates the master of FIG. 8 rolled inside a split housing in preparation for plating.
Figure 11:
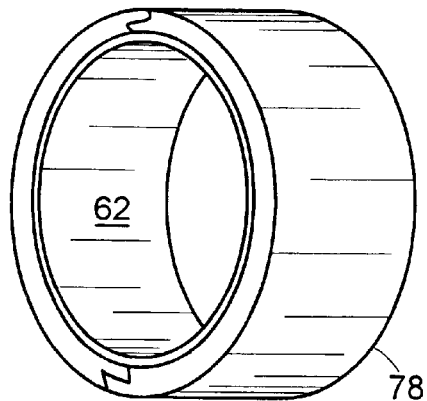
FIG. 11 shows the assembly of FIG. 9 after plating its inner surface.
Figure 11A:
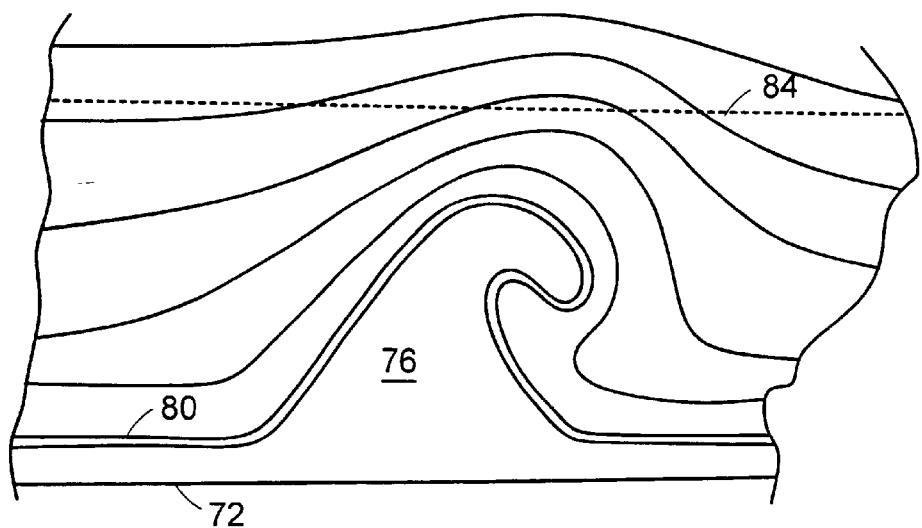
FIG. 11A shows the hook of FIG. 10 with multiple layers of plating applied.
Figure 12:
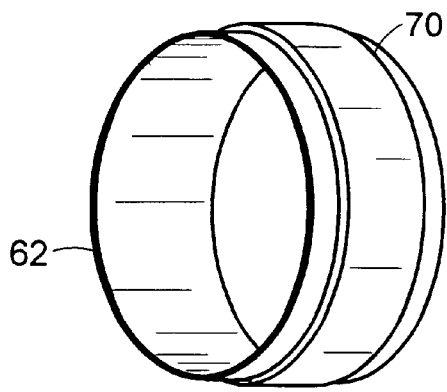
FIG. 12 shows the finished mold sleeve with the split housing removed.
Figure 13:
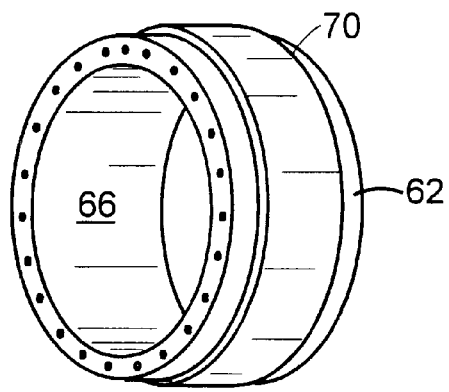
FIG. 13 shows the mold sleeve assembled to a cooling sleeve to form a sleeve assembly.
Figure 14:
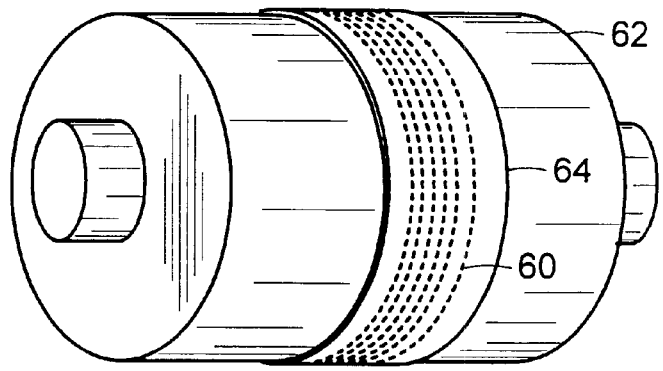
FIG. 14 shows the sleeve assembly mounted on a mold roll, with the master removed to expose mold cavities in the mold sleeve.

Referring also to FIG. 9, master 70 is rolled lengthwise into a loop, such that its two ends meet, and is held in a rigid, split sleeve 78. Sleeve 78 has an internal groove of a depth about equal to the thickness of master base 72, such that upper surface 74 of master 70 and inner surface 80 of sleeve 78 form a continuous, cylindrical surface, interrupted only by hooks 76. Inner surface 80 of sleeve 78 may be polished, or otherwise coated or treated, such that its adherence with plating is minimized. (Alternately, master 70 may be formed wider than shown, with hook-less edge regions on either side, such that it covers the entire inner surface 80 of the split sleeve.) A thin layer of copper 82 (FIG. 10), or other suitable metallic plating for use on polymer, is applied to the inner surface 80 of the sleeve, coating upper surface 74 and hooks 76 of the plastic master in preparation for electroplating. When necessary, the plastic surfaces of master 70 to be plated must first be conditioned, such as by chemical etch treatment, for proper deposit of the copper layer. The copper layer may be applied by sputtering or vapor deposition (i.e., vacuum metallizing) processes as described in the Modern Plastics Encyclopedia, 1984–85 edition, published by McGraw Hill and incorporated herein by reference. The copper-layered surfaces are then electro-plated to form mold sleeve 64 of several, thin layers of plating about hooks 76 (FIGS. 11 and 11A). After plating, the inner diameter of mold sleeve 64 is ground to form a cylindrical, smooth surface 84 represented by the dashed line in FIG. 11A. Split ring 78 is then removed (FIG. 12), and the mold sleeve is mounted on cooling sleeve 66 (FIG. 13), e.g., by a controlled sweat fit. With the mold sleeve solidly mounted, master 70, hooks and all, is stripped from the mold sleeve and the sleeve assembly is assembled to mold roll 62 (FIG. 14), leaving closed cavities 60 extending inward from openings in the outer diameter of the mold sleeve.

In use, mold sleeves and their associated cooling sleeves are readily interchanged with other sleeve assemblies for efficient retooling of a mold line. Worn mold sleeves are discarded or recycled, and are simply replaced with new sleeves, greatly reducing the amount of machine down time associated with cleaning and repairing thousands of mold plates.

Although master 70 is illustrated with hook-shaped features that are all generally aligned to extend along the length of the master, the above-described process enables the production of fastener products having fastener elements arranged in various directions, as desired. For instance, hooks are readily formed to extend along the length of the mold roll (i.e., in the cross-machine direction), or arranged such that some hooks face in a variety of different directions, to provide the overall desired shear and peel properties of the fastener product. Masters having such multiply-oriented fastener elements can be formed, for instance, by stereolithographic or injection molding techniques. Once the master is formed, it may be reused to produce several mold sleeves, depending on how well its fastening elements retain their shape while being removed from the finished sleeve.

The above sleeve-form mold roll construction diminishes alignment issues, particularly ring-to-ring misalignment which can result in uneven product base thickness and can thereby restrict the minimum base thickness achievable with some ring production techniques.

Figure 15:
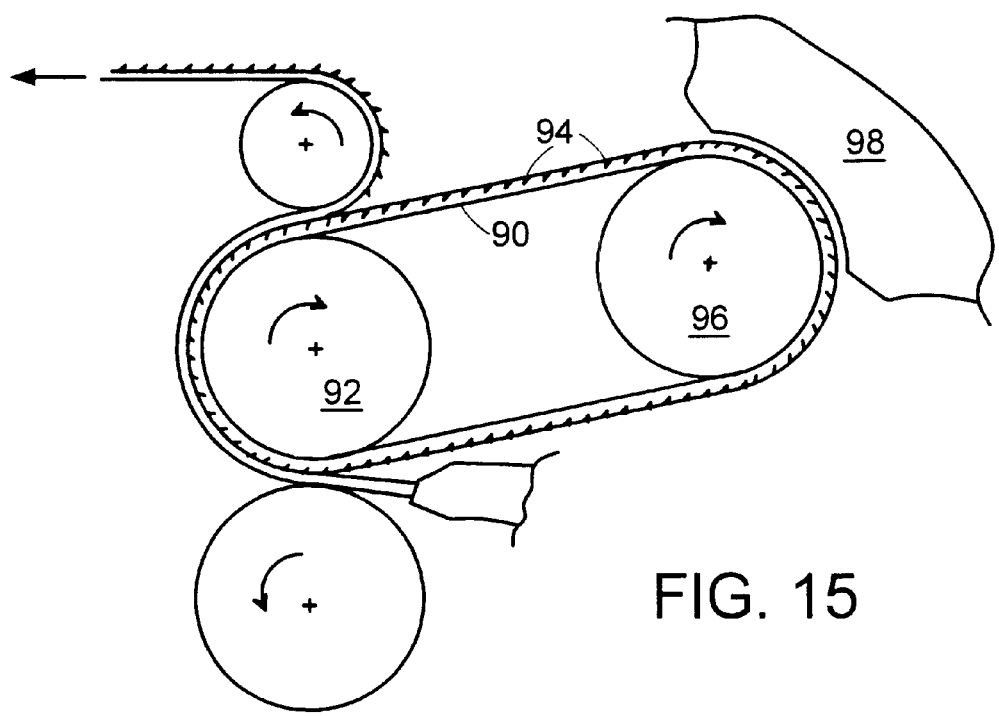
FIG. 15 schematically illustrates a molding system employing a mold belt.

Besides cylindrical mold sleeves, the above techniques may be employed to produce flexible mold belts to simulate a larger diameter mold roll for greater cooling capacity and higher production rates. For example, FIG. 15 illustrates an arrangement for molding a fastener product with a mold belt 90 trained about a driven roll 92 in place of mold roll 10 in FIG. 1. Mold belt 90 has mold cavities 94, similar to those previously described, at its outer surface, and is also trained about an auxiliary roll 96 near a belt cooling system 98. The overall length of the mold belt is much greater than the circumference of driven roll 92.

Figure 16:
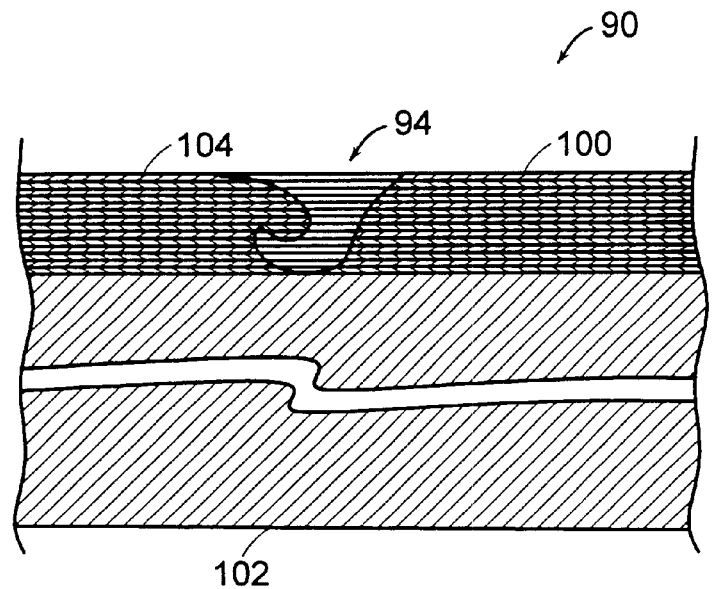
FIG. 16 is an enlarged cross-sectional view of a portion of the mold belt of FIG. 15, showing its construction.

Referring to FIG. 16, cavities 94 in mold belt 90 are formed by multiple layers of plating 100 applied in 15 successive steps to a belt-form workpiece 102. The material of workpiece 102 and plating 100 are preferably selected to have about the same stiffness for surviving the small amount of flexure that occurs as the belt revolves about the rolls. As described above, a photoresist material is applied to the surface of the workpiece to mask areas not to be plated. The thickness of each plating layer is controlled to be about the same as the thickness of the associated masking layer of photoresist material. In successive stages, alternating steps of applying photoresist material and plating the workpiece progressively form fastener-shaped cavities 94, with the last plating layer forming the outer surface 104 of the finished mold belt.

In a similar manner, mold belt 90 may be formed as a flat, strip-form member and subsequently formed into a belt by joining the two ends of the strip, for example, by electron beam welding.

Mold belts can provide rapid machine retooling, as the mold belt may be replaced without removing any of the main rolls in the machine stack.

Besides having direct applicability to the continuous formation of fastener products, the above methods are also useful for producing fixed molds for the injection molding of discrete fastener products, as well as for continuous or discrete molding of other products with very small, protruding features, such as artificial grass or textured wall coverings.

These and other embodiments and features are within the scope of the following claims.

What is claimed is:

1. A method of producing a multiplicity of miniature mold cavities extending from a common surface, for molding a plastic product having a corresponding multiplicity of miniature features integrally molded with and extending from a common base, the method comprising
   depositing multiple layers of plating material onto a workpiece in predetermined patterns selected to produce desired mold cavity shapes such that the deposited plating material defines the multiplicity of miniature mold cavities and the common surface.

2. The method of claim 1 wherein the cavities each have a crook, for molding a fastener element with an engageable crook portion.

3. The method of claim 2 wherein the cavities are constructed to mold hook-shaped fastener elements.

4. The method of claim 1 wherein the miniature mold cavities are constructed to mold elements that extend less than about 0.050 inch from the common surface.

5. The method of claim 4 wherein the miniature mold cavities are constructed to mold elements that extend less than about 0.025 inch from the common surface.

6. The method of claim 1 wherein the workpiece comprises at least part of a mold for molding a plastic fastener product.

7. The method of claim 6 comprising
   applying a masking material to selected portions of the workpiece to produce masked surfaces,
   depositing a layer of said plating material to the workpiece to surfaces other than the masked surfaces, and
   removing the masking material from the masked surfaces to expose unplated surfaces of the workpiece.

8. The method of claim 6 wherein the workpiece comprises a flat plate, the plating material being deposited on one broad side of the plate to form mold surfaces at an edge thereof, for defining mold cavities extending from said edge.

9. The method of claim 8 wherein the plating material is deposited to form one side of a mold cavity, another side of the cavity being defined by a surface of an adjoining plate.

10. The method of claim 8 further comprising the step of machining the deposited plating material to remove an outer portion thereof to provide a flat surface for abutting an adjoining mold part.

11. The method of claim 6 wherein the plating material defines fully-formed mold cavities, each extending from an innermost portion to a base portion at an outer surface of the plating, the layers of deposited plating material defining, in order of deposition, said cavities from their innermost portions to their base portions.

12. The method of claim 11 wherein the workpiece comprises a flexible belt.

13. The method of claim 1 wherein the overall thickness of the multiple layers of plating material is between about 0.001 inch and 0.015 inch.

14. The method of claim 13 wherein the overall thickness of the multiple layers of plating material is between about 0.002 inch and 0.007 inch.

15. The method of claim 14 wherein the overall thickness of the multiple layers of plating material is about 0.004 inch.

16. The method of claim 1 wherein the workpiece comprises a master, the method further comprising the step of removing the master from the plating to form a mold for molding a plastic fastener product.

17. The method of claim 16 wherein the master has fastener elements extending from a surface of the product base.

18. The method of claim 17 wherein the fastener elements are hook-shaped.

19. The method of claim 16 wherein the mold comprises a cylindrical mold sleeve with fully-formed mold cavities extending inward from its outer surface.

20. The method of claim 16 wherein the mold has an overall thickness of between about 0.005 inch and 0.050 inch.

21. The method of claim 16 comprising depositing a layer of metal on the master before depositing the plating material.

22. The method of claim 21 wherein the metal comprises copper.

23. A method of producing a mold defining an array of mold cavities extending from a common surface, for producing an array of plastic elements integrally molded with and extending from a broad side of a base, the method comprising
   providing a master having a surface from which an array of master features extend, the features having shapes corresponding to the shapes of the elements to be molded;
   depositing plating material across the surface of the master to cover the master features; and
   removing the master from the deposited plating material to expose an array of cavities extending into the plating material, each cavity corresponding to a master feature and shaped for molding an element therein.

24. The method of claim 23 wherein the mold cavities have crooks, for molding fastener elements with engageable crook portions.

25. The method of claim 24 wherein the mold cavities are constructed to mold hook shaped fastener elements.

26. The method of claim 23 wherein the mold cavities extend less than about 0.050 inch from the common surface.

27. The method of claim 26 wherein the mold cavities extend less than about 0.025 inch from the common surface.

28. The method of claim 23 wherein the deposited plating material has an overall thickness of between about 0.001 inch and 0.015 inch.

29. The method of claim 28 wherein the deposited plating material has an overall thickness of between about 0.002 inch and 0.007 inch.

30. The method of claim 29 wherein the overall thickness of the deposited plating material is about 0.004 inch.

31. The method of claim 23 wherein the master features are of molded plastic.

32. The method of claim 31 wherein the master features are hook-shaped.

33. The method of claim 23 wherein the deposited plating material forms a cylindrical mold sleeve with the cavities extending radially inward from an outer surface thereof.

34. The method of claim 33 wherein the deposited plating material has an overall thickness of between about 0.005 inch and 0.050 inch.

35. The method of claim 23 wherein the step of depositing comprises depositing a layer of copper on the master.

36. A method of producing a mold roll defining an array of cavities extending inward from a peripheral surface, for continuously molding an array of fastener element features extending from a sheet-form base, the method comprising providing a master having a surface from which an array of master features extend, the master features having shapes corresponding to the shapes of fastener element features to be molded;

arranging the master inside a rigid sleeve;

depositing plating material across the surface of the master to cover the master features and form a cylindrical mold sleeve of plating material; and removing the master from the deposited plating material to expose an array of cavities extending into the mold sleeve from a peripheral surface thereof, each cavity corresponding to a master feature and shaped for molding a fastener element feature therein.

37. The method of claim 36 wherein the mold cavities have crooks, for molding fastener elements with engageable crook portions.

38. The method of claim 37 wherein the mold cavities are shaped to mold hook-shaped fastener elements.

39. The method of claim 36 wherein the mold cavities extend less than about 0.050 inch from the peripheral surface.

40. The method of claim 39 wherein the mold cavities extend less than about 0.025 inch from the peripheral surface.

41. The method of claim 40 wherein the deposited plating material has an overall thickness of between about 0.001 inch and 0.015 inch.

42. The method of claim 41 wherein the deposited plating material has an overall thickness of between about 0.002 inch and 0.007 inch.

43. The method of claim 36 wherein the master features comprise fastener elements extending from a surface of the master.

44. The method of claim 43 wherein the fastener elements of the master are hook-shaped.

45. The method of claim 36 wherein the step of depositing comprises depositing a layer of copper on the master.

* * * * *